United States Patent [19]

Sandrock

[11] 4,282,769

[45] Aug. 11, 1981

[54] TRANSMISSION SHIFTER NEUTRAL LOCK

[75] Inventor: Don G. Sandrock, McHenry, Ill.

[73] Assignee: Fiat-Allis Construction Machinery, Inc., Deerfield, Ill.

[21] Appl. No.: 101,111

[22] Filed: Dec. 7, 1979

[51] Int. Cl.³ ............................................. G05G 5/06
[52] U.S. Cl. ......................................... 74/475; 70/201; 70/247; 74/526; 74/527; 180/287
[58] Field of Search ................. 74/473 R, 475, 527, 74/532, 526; 70/201, 202, 247; 180/287

[56] References Cited

U.S. PATENT DOCUMENTS

| 1,126,781 | 2/1915 | Kehoe | 70/201 X |
| 1,406,231 | 2/1922 | Seaholm | 70/201 |
| 1,480,323 | 1/1924 | White | 70/201 |
| 3,508,424 | 4/1970 | Eisenman | 70/202 |
| 4,077,276 | 3/1978 | Knox, Jr. | 74/475 |
| 4,163,398 | 8/1979 | Johnston | 74/483 K |

Primary Examiner—Allan D. Hermann
Attorney, Agent, or Firm—August E. Roehrig, Jr.; Robert A. Brown; John A. Doninger

[57] ABSTRACT

A lock assembly for a transmission gear shift lever that uses a detent latch-type lock pivotably mounted to a support structure adjacent to the transmission gear shift lever. Upon rotation of the latch, a locking arm is mated with the gear shift lever thereby securing it in the neutral position. The lock functions primarily as a safety device to hold the gear shift lever of the vehicle's transmission in a neutral position thereby preventing damage or bodily injury that could occur if the shift lever is accidentally or unintentionally jarred thereby placing the transmission into gear.

8 Claims, 4 Drawing Figures

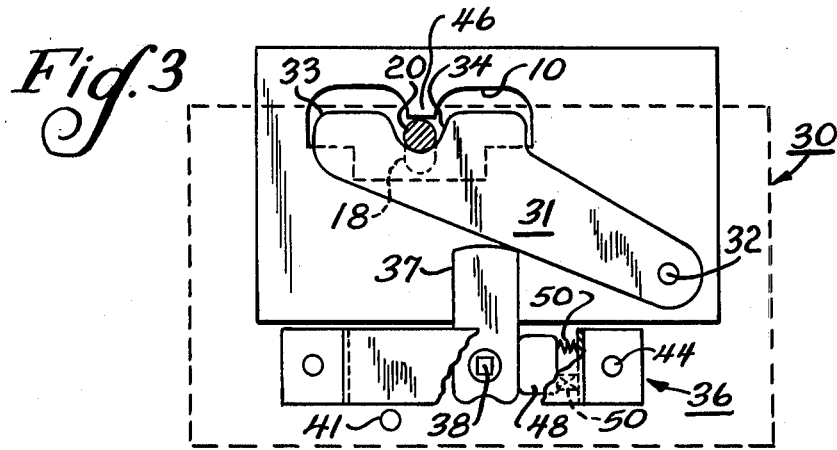
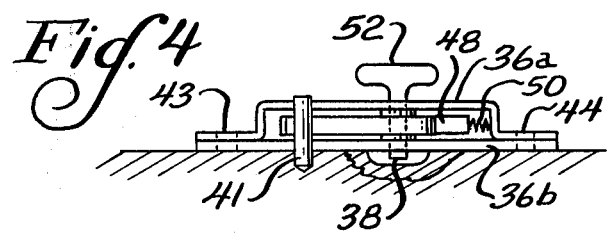

TRANSMISSION SHIFTER NEUTRAL LOCK

BACKGROUND OF THE INVENTION

This invention relates in general to locking devices and, more particularly, to a detent latch or lock for a vehicle transmission gear shifter. More specifically, but without restriction to the particular use which is shown and described, this invention relates to a pivoting detent latch for securing a transmission gear shift lever in a desired position.

In vehicles such as construction machinery or earthmoving equipment, a transmission is utilized to couple the output of a vehicle engine to the drive mechanism. The transmission has a gear shift lever through which the vehicle operator can manually shift the transmission into the gear desired.

Generally, there are plurality of gear positions into which the transmission can be shifted, i.e., forward, reverse or neutral, in order to effect vehicle operation. The gear shift lever, which is freely movable through the plurality of gear positions, is utilized to shift the transmission among these gear positions.

When the vehicle is not in use, or not being driven, the shift lever should be placed in the gear position corresponding to neutral so that the transmission is not engaged. However, due to the movability of the shift lever, there can be no adequate assurances that the gear shift lever will remain in the neutral position once it is positioned there. For example, if the vehicle operator puts the shift lever of the vehicle in the neutral position and leaves the vehicle engine running, the vibrations of the vehicle could cause the shift lever to accidentally be jarred into a driving gear position. Such accidental shifting into forward or reverse, would cause the vehicle to move of its own accord, potentially causing considerable property damage or bodily injury to those in close proximity.

In order to prevent damage to the vehicle, property damage or bodily injury that could result from the shift lever being accidentally or unintentionally jarred into a drive position, it is desirable to provide a safety device that will securely hold the gear shift lever in a neutral position. Such a device must function so that when the gear shift lever is positioned in neutral by the vehicle operator, it will remain in that position until the vehicle operator desires to engage one of the drive gear positions in order to move the vehicle.

The present invention, therefore, provides a positive detent latch or lock that utilizes a locking arm with a latch member whereby the member is manually rotated to contact the locking arm and move the gear shift lever into engagement with stop means. The shift lever is then fixedly secured in the neutral position, and can only be moved from neutral when the vehicle operator manually rotates the latch member in reverse direction, thereby allowing free movement of the gear shift lever.

The prior art includes various devices for locking a gear shift lever in the neutral position. One such device is shown in U.S. Pat. No. 4,163,398. This patent discloses a pair of levers located on opposite sides of a shift lever and selectively operable to hold the shift lever in the neutral position. The prior art further includes various locks, such as a tool box lock, which are movable between a first position wherein an associated member is free to move and a second position wherein the associated member is locked in position.

SUMMARY OF THE INVENTION

It is, therefore, an object of this invention to improve self-propelled vehicles.

Another object of this invention is to insure that a vehicle transmission cannot be accidentally or unintentionally jarred into a drive gear position, thereby causing damage or bodily injury.

A further object of this invention is to maintain the transmission shift lever connected to the vehicle's transmission in neutral position at times when the vehicle is not in use.

Still another object of this invention is to insure that the transmission shift lever is secured in the neutral position when the vehicle is not being used by utilizing a locking arm and a detent lock.

These and other objects are attained in accordance with the present invention wherein there is provided a lock assembly for a transmission gear shift lever that uses a detent latch-type lock pivotally mounted to a support structure adjacent to a transmission gear shift lever. Upon rotation of the latch, a locking arm is mated with the gear shift lever thereby securing it in the neutral position. The lock functions primarily as a safety device to hold the gear shift lever of the vehicle's transmission in neutral position thereby preventing damage or injury that could occur if the shift lever is accidentally or unintentionally jarred, thereby placing the transmission into a driving gear.

DESCRIPTION OF THE DRAWINGS

Further objects of the invention together with additional features contributing thereto and advantages accruing therefrom will be apparent from the following description of the preferred embodiment of the invention which are shown in several drawings with like reference numerals indicating corresponding parts throughout wherein:

FIG. 3 illustrates a locking device in accordance with the present invention with the shift lever held in the neutral position and with the handle and a portion of the locking device cut away for clarity; and FIG. 4 is a sectional view taken along a line 4—4 of FIG. 2.

DESCRIPTION OF THE PREFERRED EMBODIMENT

Figure 1:
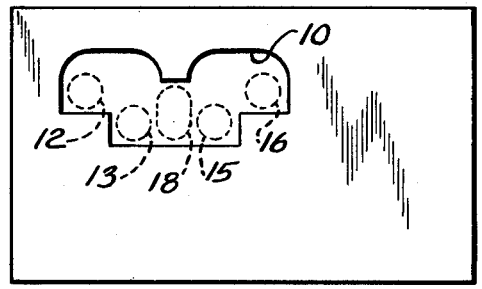
FIG. 1 shows a gate configuration depicting a gear shift pattern used in accordance with the present invention.

Referring now to FIG. 1, there is shown a gate 10 having an opening therein which defines a typical shift configuration for a transmission (not shown) of a vehicle. For convenience of illustration, the gate 10 of the present invention is disclosed in use with a vehicle transmission having five gear positions 12, 13, 15, 16 and 18. Positions 12 and 13 correspond to forward drive gear positions; positions 15 and 16 correspond to reverse drive gear positions; and position 18 corresponds to a neutral gear position. However, it is to be understood that the invention is not intended to be so limited, but is suitable for use with vehicles that have transmissions operable in additional and/or other gear drive positions.

Figure 2:
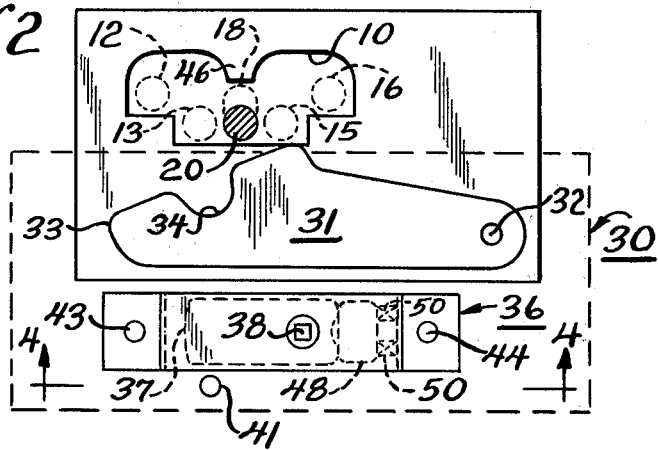
FIG. 2 illustrates a locking device of the present invention shown in an open position.

The operation of the vehicle's transmission is controlled by a shift lever 20, which is connected to the transmission by suitable linkage (not shown). In FIG. 2 the shift lever 20 is shown in the neutral position 18 of the gate 10. It is customary to disengage the transmission by placing it in the neutral position 18 whenever the vehicle is not in operation. However, because the shift lever 20 can accidentally or unintentionally be moved from the neutral position 18, in order to insure that the shift lever 20 stays in the neutral position, a locking assembly 30 is provided. The lock or latch assembly 30 will securely hold the gear shift lever 20 in the neutral position 18 thereby preventing it from being accidentally or unintentionally moved into one of the gear drive position 12, 13, 15 or 16.

The latch assembly 30 includes a locking arm 31 pivotally mounted at one end by a bolt 32 for movement in an arcuate path between the open position, shown in FIG. 2, and the locked position, shown in FIG. 3. The free end 33 of the locking arm 31 has a notch 34 formed therein that is contoured to the shape of the gear shift lever 20 so that the locking arm 31 and the shift lever 20 can be fitted together as best seen in FIG. 3. The locking arm 31 is pivotable in a plane substantially normal to the shift lever 20 and, in the locked position, the shift lever 20 is held within the notch 34 abuttably engaging stop means 46. When the locking arm 31 has been pivoted into the locked position and engages lever 20, the gear shift lever cannot be moved from the neutral position 18.

The locking device 30 further includes a fixture 36 having a generally U-shaped portion 36a and a base portion 36b. A lock actuation or latch member 37 (FIG. 4) is mounted between the U-shaped portion 36a and the base portion 36b for pivotal movement in response to rotation of shaft 38. The fixture 36 is attached as by bolts 43, 44 to a support structure adjacent to the locking arm 31 such that the lock actuating member 37 and the locking arm 31 lie in substantially the same plane.

The lock actuating member 37 comprises a first or free end for engaging the locking arm 31 and a second end portion which is engaged by a detent 48. The detent 48 is biased into engagement with the second end portion by springs 50 or other suitable means. The spring-biased detent 48 operates to hold the lock actuating member in the disengaged position, as shown in FIG. 2, and the locked position, as shown in FIG. 3. Check means 41 is provided adjacent the fixture 36 to limit motion of the actuating member 37. A T-handle 52 is attached to the shaft 38 to facilitate rotation thereof. In the preferred embodiment the shaft 38 is square and mates with a similarly shaped opening in the latch member 37, but it is understood that any suitable means of coupling the shaft 38 to the latch member 37 can be utilized.

In operation, after the gear shift lever 20 is placed into the neutral position 18 by the vehicle operator, the latch member 37 is rotated in a clockwise direction about the shaft 38 until it contacts the locking arm 31. The locking arm 31 is thereby caused to pivot in an arcuate path such that the notch portion 34 engages the shift lever 20. The shift lever 20 in turn abuttably engages the stop means 46. The notch 34 on the locking arm 31 is of a size both to ensure that the gear shift lever 20 can be easily secured by the locking arm 31, and also to make certain there will not be sufficient clearance therebetween to allow the gear shift lever 20 to move through the gate 10 and into one of the gear drive positions 12, 13, 15 or 16.

When the vehicle operator then desires to move the vehicle, he must manually turn the latch 37 counterclockwise to return it to its original position (as shown by dotted lines in FIG. 2) thereby releasing the locking arm 31 from the gear shift lever 20. This will return the locking arm 31 to its original position allowing free movement of the gear shift lever 20 throughout the other gear drive positions 12, 13, 15 and 16.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying our this invention, but that the invention will include all embodiments falling within the scope of the appended claims.

What is claimed is:

1. A lock assembly for securely retaining a gear shift lever of a vehicle transmission in a neutral position to prevent accidental or unintentional movement of the gear shift lever into a drive position comprising
   manually operable locking means having a locking arm pivotably mounted for selective movement to engage and retain a transmission gear shift lever in a neutral position, and
   said locking means further including a lock actuating member having a first end portion adapted to contact said locking arm and a second end portion pivotally mounted to a support sutructure for selective manual movement between a first position spaced from said locking arm to a second position in contact with said locking arm for effecting said selective movement of said locking arm to engage and retain a transmission gear shift lever in a neutral position.

2. The lock assembly of claim 1 wherein said lock actuating member is pivotally mounted on a fixture attached to the support structure.

3. The lock assembly of claim 1, wherein said locking arm effects retention of said shift lever in the neutral position by moving said shift lever into abutting engagement with stop means, thereby entrapping the shift lever between said locking arm and said stop means.

4. The lock assembly of claim 3 wherein said locking arm includes a notch portion adapted to embrace the gear shift lever thereby preventing said gear shift lever from slipping out of the neutral position.

5. The lock assembly of claim 1 wherein said locking means further includes check means operatively positioned adjacent to said lock actuating member to limit movement thereof.

6. The lock assembly of claim 1 wherein said lock actuating member is coupled to manually operable handle means, said selective manual movement of said lock actuating member being effected through movement of said handle means.

7. The lock assembly of claim 6 wherein said handle means is mounted for rotational movement.

8. The lock assembly of claim 1, wherein said lock actuating member is maintained in said first and second positions by detent means adapted to engage said second end portion.

* * * * *